(12) United States Patent
Nakayama et al.

(10) Patent No.: US 10,505,426 B2
(45) Date of Patent: Dec. 10, 2019

(54) DYNAMO-ELECTRIC MACHINE

(71) Applicant: Hitachi Automotive Systems, Ltd., Hitachinaka-shi, Ibaraki (JP)

(72) Inventors: Kenichi Nakayama, Hitachinaka (JP); Naoki Nishikawa, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 345 days.

(21) Appl. No.: 15/634,204

(22) Filed: Jun. 27, 2017

(65) Prior Publication Data

US 2018/0375397 A1 Dec. 27, 2018

(51) Int. Cl.
| H02K 3/34 | (2006.01) |
| H02K 15/06 | (2006.01) |
| H02K 3/12 | (2006.01) |
| H02K 3/28 | (2006.01) |
| H02K 7/00 | (2006.01) |
| H02K 1/27 | (2006.01) |

(52) U.S. Cl.
CPC ........... H02K 3/345 (2013.01); H02K 3/12 (2013.01); H02K 3/28 (2013.01); H02K 7/006 (2013.01); H02K 15/064 (2013.01); *H02K 1/2766* (2013.01)

(58) Field of Classification Search
CPC .................................................. H02K 3/345
See application file for complete search history.

(56) References Cited

U.S. PATENT DOCUMENTS

| 2001/0040415 | A1 | 11/2001 | Asao et al. | |
| 2011/0181143 | A1 | 7/2011 | Hasegawa et al. | |
| 2012/0161555 | A1 | 6/2012 | Sawada et al. | |
| 2014/0300239 | A1* | 10/2014 | Takizawa | H02K 3/12 310/208 |
| 2015/0364977 | A1* | 12/2015 | Hattori | H02K 3/38 310/208 |
| 2016/0042833 | A1* | 2/2016 | Kawanishi | H01F 5/06 174/128.2 |

(Continued)

FOREIGN PATENT DOCUMENTS

| JP | 11-341730 A | 12/1999 |
| JP | 2001-119883 A | 4/2001 |
| JP | 2011-151975 A | 8/2011 |

(Continued)

OTHER PUBLICATIONS

International Search Report (PCT/ISA/210) issued in PCT Application No. PCT/JP2018/014852 dated Jul. 3, 2018 (three pages).

*Primary Examiner* — Robert W Horn
(74) *Attorney, Agent, or Firm* — Crowell & Moring LLP

(57) ABSTRACT

A reduction in size and an improvement in cooling performance of a dynamo-electric machine are achieved. A stator of a dynamo-electric machine according to the present invention includes a plurality of segment coils surrounding a rotation axis, a stator core partially accommodating each of the segment coils, and an insulating coating covering at least certain portions of the segment coils protruding from the accommodating space of the stator core, in which the segment coils are arranged in a direction from the rotation axis to a radially outer side, and the volume of the insulating coating is larger on a radially outer side than on a side close to the rotation axis.

7 Claims, 14 Drawing Sheets

(56) References Cited

U.S. PATENT DOCUMENTS

2016/0329770 A1* 11/2016 Ishii ........................ H02K 3/40
2018/0375397 A1* 12/2018 Nakayama ............. H02K 3/345

FOREIGN PATENT DOCUMENTS

| JP | 2015-177656 A | 10/2015 |
| JP | 2017-50937 A | 3/2017 |
| WO | WO 2011/013809 A1 | 2/2011 |

* cited by examiner

DYNAMO-ELECTRIC MACHINE

FIELD OF THE INVENTION

The present invention relates to a stator, a dynamo-electric machine using the stator, and a method of manufacturing the stator of the dynamo-electric machine, and particularly relates to a stator that generates torque for vehicle traveling or generates electricity during braking, a dynamo-electric machine using the stator, and a method of manufacturing the stator of the dynamo-electric machine.

BACKGROUND OF THE INVENTION

In the dynamo-electric machine, a rotating magnetic field is generated by supplying AC power to a stator winding, and a rotor is rotated by the rotating magnetic field. Furthermore, mechanical energy applied to the rotor can be converted into electric energy so that AC power is output from a coil. In this way, the dynamo-electric machine operates as an electric motor or a generator.

A known stator of such a dynamo-electric machine is configured such that ends of segment conductors are connected to each other by welding (see Japanese Patent Laid-Open No. 2011-151975, for example). In a previously provided dynamo-electric machine, the entire surface and a root of a coil end portion of a stator winding have adhesive properties to fill a gap between coils, thereby insulating performance of each coil end of a stator coil is improved, vibration proof is secured, and wind noise is reduced (see Japanese Patent Laid-Open No. 2001-119883, for example).

SUMMARY OF THE INVENTION

When this type of dynamo-electric machine is mounted in a vehicle, the dynamo-electric machine is mounted in a narrow and limited space, and is therefore required to have small size. Coil end height is desired to be low in order to secure a gap between the top of the coil end and a mission part. Furthermore, a liquid refrigerant (RF) such as oil dropped from the upper side must uniformly and effectively cool the whole circumference of a coil configured by segment conductors made of a rectangular wire. In some portion, the refrigerant (RF) falls and is less likely to flow along the coil end particularly depending on a coil shape.

A stator of a dynamo-electric machine according to the present invention includes a plurality of segment coils surrounding a rotation axis, a stator core partially accommodating each of the segment coils, and an insulating coating covering at least certain portions of the segment coils protruding from an accommodating space of the stator core, in which the segment coils are arranged in a direction from the rotation axis to a radially outer side, and the volume of the insulating coating is larger on a radially outer side than on a side close to the rotation axis.

According to the present invention, a reduction in size and an improvement in cooling performance of a dynamo-electric machine can be achieved.

DETAILED DESCRIPTION OF THE PREFERRED EMBODIMENTS

Figure 14:
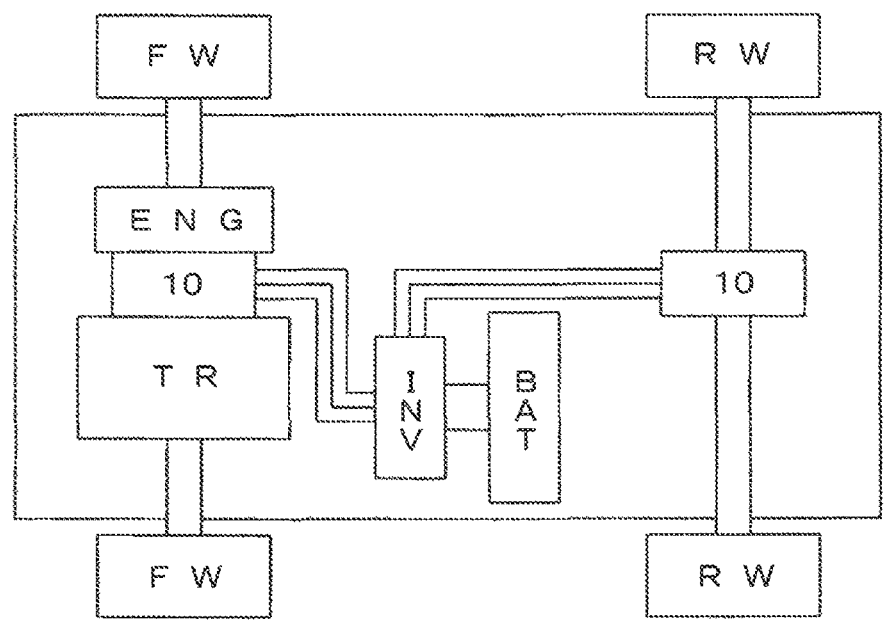
FIG. 14 is a schematic diagram illustrating a schematic configuration of a power train of a hybrid vehicle on the assumption of four-wheel drive.

Hereinafter, a mode for carrying out the present invention will be described with reference to FIG. 14. A dynamo-electric machine 10 of this embodiment is preferably used for vehicle traveling. A so-called electric vehicle using the dynamo-electric machine 10 includes a hybrid type electric vehicle (HEV) including both an engine ENG and the dynamo-electric machine 10, and a pure electric vehicle (EV) that travels only with the dynamo-electric machine 10 without the engine ENG. While the dynamo-electric machine described below can be used for both the types of electric vehicles, description is now made typically based on the dynamo-electric machine used for the hybrid type vehicle.

In the following description, "axial direction" refers to a direction along a rotation axis of the dynamo-electric machine. A circumferential direction refers to a direction along a rotational direction of the dynamo-electric machine. "Radial direction" refers to a radial direction with the rotation axis of the dynamo-electric machine as a center. "Inner peripheral side" refers to a radially inner side (inner diameter side), and "outer peripheral side" refers to the opposite side, i.e., radially outer side (outer diameter side).

[Description of Schematic configuration of Vehicle]

First, a schematic configuration of a vehicle having a dynamo-electric machine therein is described with reference to FIG. 14. FIG. 14 is a schematic diagram showing a schematic configuration of a power train of a hybrid vehicle on the assumption of four-wheel drive. The engine ENG and a dynamo-electric machine 10 are provided as the main power on the front wheel side. Power generated by the engine ENG and the dynamo-electric machine 10 is transmitted to a front drive wheel FW via a transmission TR that performs gear shift. To drive rear wheels, a dynamo-electric machine 10 disposed on a rear wheel side is mechanically connected to a rear driving wheel RW so that power is transmitted. A dynamo-electric machine 10 as a power source on the front wheel side is disposed between the engine ENG and the transmission TR.

The dynamo-electric machine 10 starts the engine ENG, and switches between generation of driving force and generation of electric energy by recovering energy output during vehicle deceleration as electric energy in correspondence to a vehicle travelling state. The drive operation and the power generation operation of the dynamo-electric machine 10 are controlled by a power conversion device INV to optimize the torque and the number of revolutions in correspondence to a vehicle driving situation. The electric power necessary for driving the dynamo-electric machine 10 is supplied from a battery BAT via the power conversion device INV. In addition, while the dynamo-electric machine 10 performs the power generation operation, electric energy is charged in the battery BAT via the power conversion device INV.

The dynamo-electric machine 10 is a three-phase synchronous motor with a built-in permanent magnet. When a three-phase alternating current is supplied to a stator coil, the dynamo-electric machine 10 operates as an electric motor that rotates a rotor. In addition, the dynamo-electric machine 10 driven by the engine ENG operates as a generator and outputs the generated three-phase AC power. That is, the dynamo-electric machine 10 has both a function of an electric motor that generates rotational torque based on electric energy and a function of a generator that generates electric power based on mechanical energy. Such functions can be selectively used depending on a vehicle travelling state.

[Description of Dynamo-Electric Machine 10]

Figure 1:
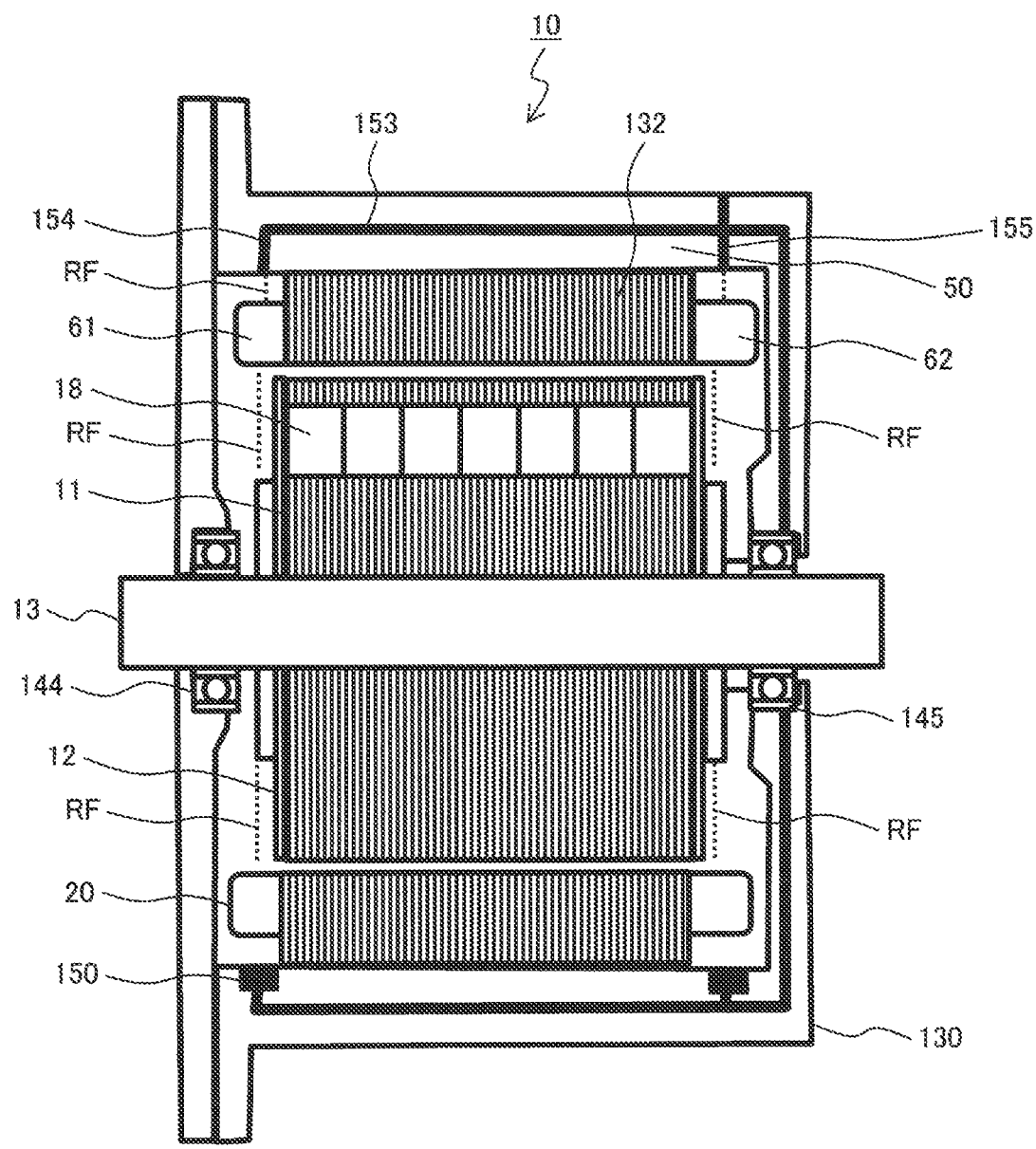
FIG. 1 is a sectional view of a dynamo-electric machine 10 according to one embodiment.

FIG. 1 is a sectional view of the dynamo-electric machine 10 according to this embodiment. In this embodiment, the dynamo-electric machine 10 is disposed within a liquid cooling jacket 130. The liquid cooling jacket 130 is configured by a casing of the engine ENG or a casing of the transmission TR. The dynamo-electric machine 10 includes a stator 20, a housing 50 that holds the stator 20, and a rotor 11.

The liquid cooling jacket 130 is fixed to the outer peripheral side of the housing 50. The inner peripheral wall of the liquid cooling jacket 130 and the outer peripheral wall of the housing 50 configure a refrigerant passage 153 for a liquid refrigerant (RF) such as oil. A shaft 13 to which the rotor 11 is fixed is rotatably supported by a bearing 144 and a bearing 145 provided in the liquid cooling jacket 130. Hence, the liquid cooling jacket 130 is also referred to as a bearing bracket.

In the case of a direct liquid cooling system, a liquid as the refrigerant (RF), which is collected in a refrigerant storage space 150, outflows to the stator 20 through the refrigerant passage 153, a refrigerant passage 154, and a refrigerant passage 155, and cools the stator 20. The refrigerant (RF) may be a cooling oil.

The stator 20 is fixed to the inner peripheral side of the housing 50. The rotor 11 is rotatably supported on the inner peripheral side of the stator 20. The housing 50 is formed into a cylindrical shape by cutting an iron-based material such as carbon steel, by casting cast steel or aluminum alloy, or by press working, and configures an outer covering of the dynamo-electric machine 10. The housing 50 is also referred to as a frame body or a frame.

The housing 50 is formed into a cylindrical shape by drawing of a steel plate (such as a high tensile strength steel plate) having a thickness of about 2 to 5 mm. The housing 50 has a plurality of undepicted flanges to be attached to the liquid cooling jacket 130. The flanges are provided to protrude radially outward at a circumferential edge of one end face of the cylindrical housing 50. The flanges are formed by cutting off any portion other than the flanges at an end portion formed during drawing, and are integrated with the housing 50. The stator 20 may be directly fixed to the liquid cooling jacket 130 as a casing without providing the housing 50.

Figure 2:
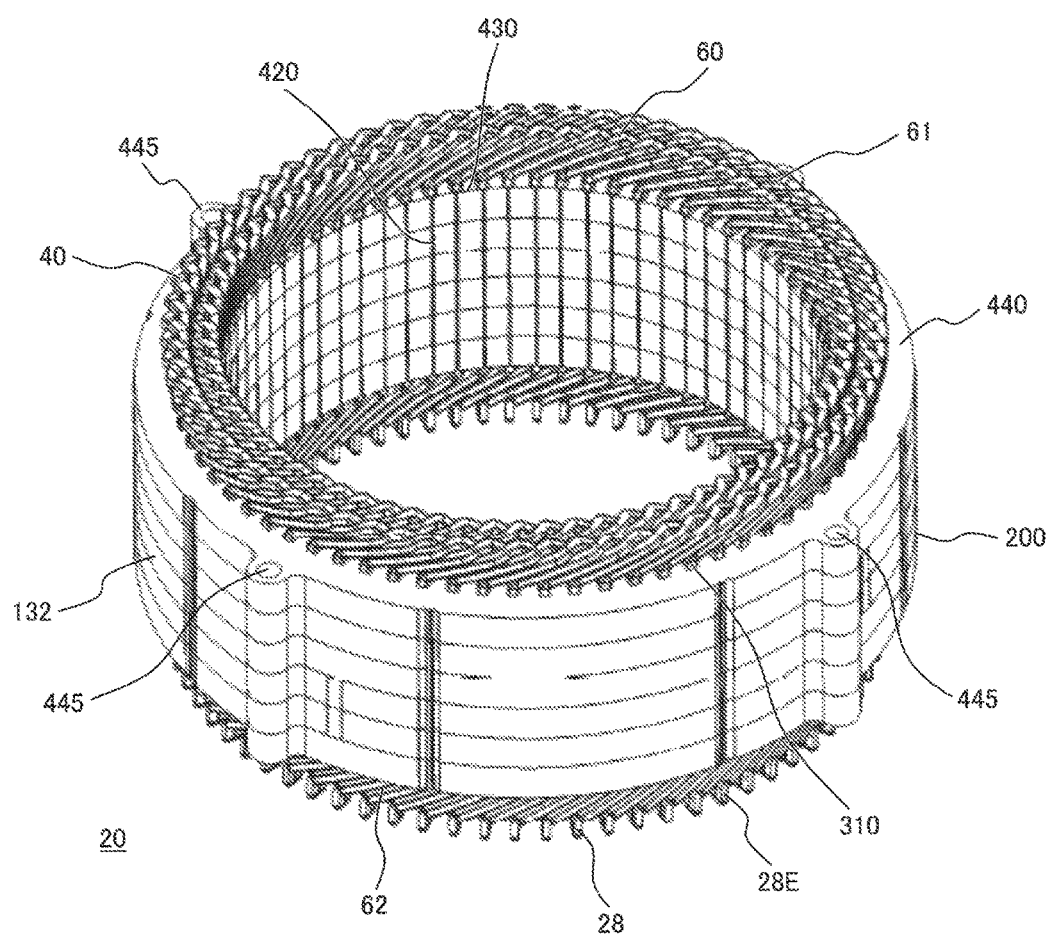
FIG. 2 is an overall perspective view of a stator 20.
Figure 3:
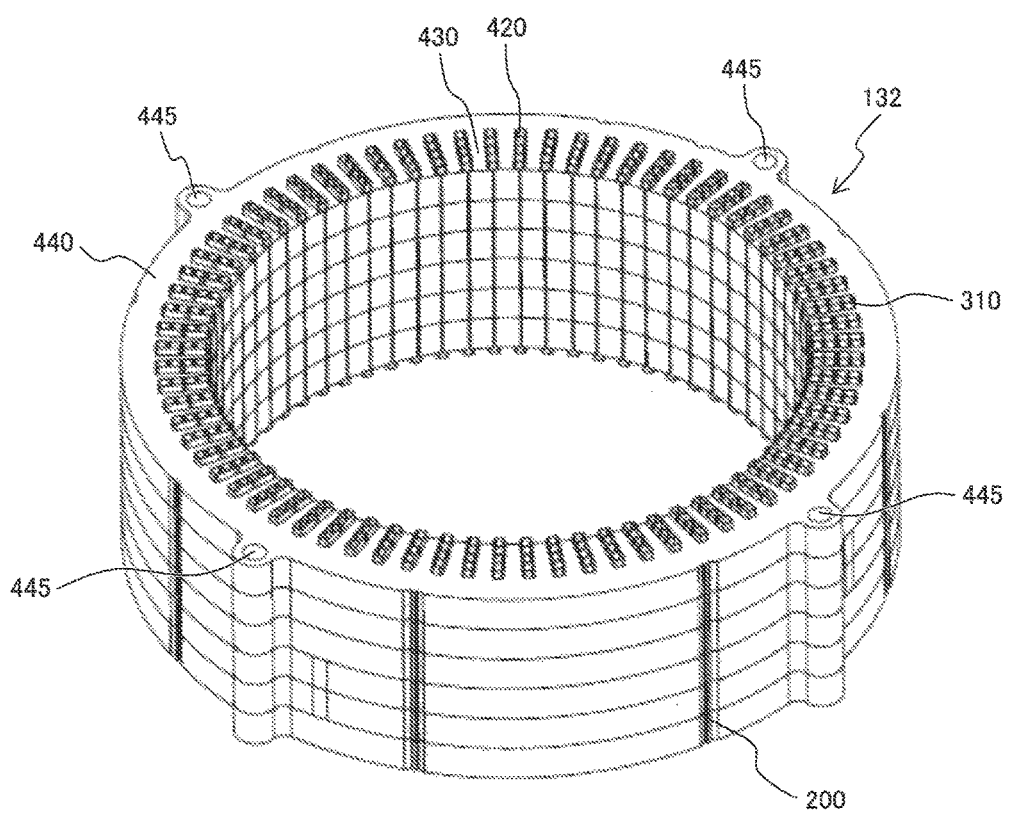
FIG. 3 is an overall perspective view of a stator core 132.

FIG. 2 is an overall perspective view of the stator 20. FIG. 3 is an overall perspective view of a stator core 132. As shown in FIG. 2, the stator 20 is configured by the stator core 132 and a stator coil 60. The stator core 132 is a laminate of thin silicon steel sheets. The stator coil 60 is wound in a large number of slots 420 provided on the inner periphery of the stator core 132. Heat generated from the stator coil 60 is transferred to the liquid cooling jacket 130 via the stator core 132, and is radiated by the refrigerant (RF) circulating through the liquid cooling jacket 130.

Figure 4:
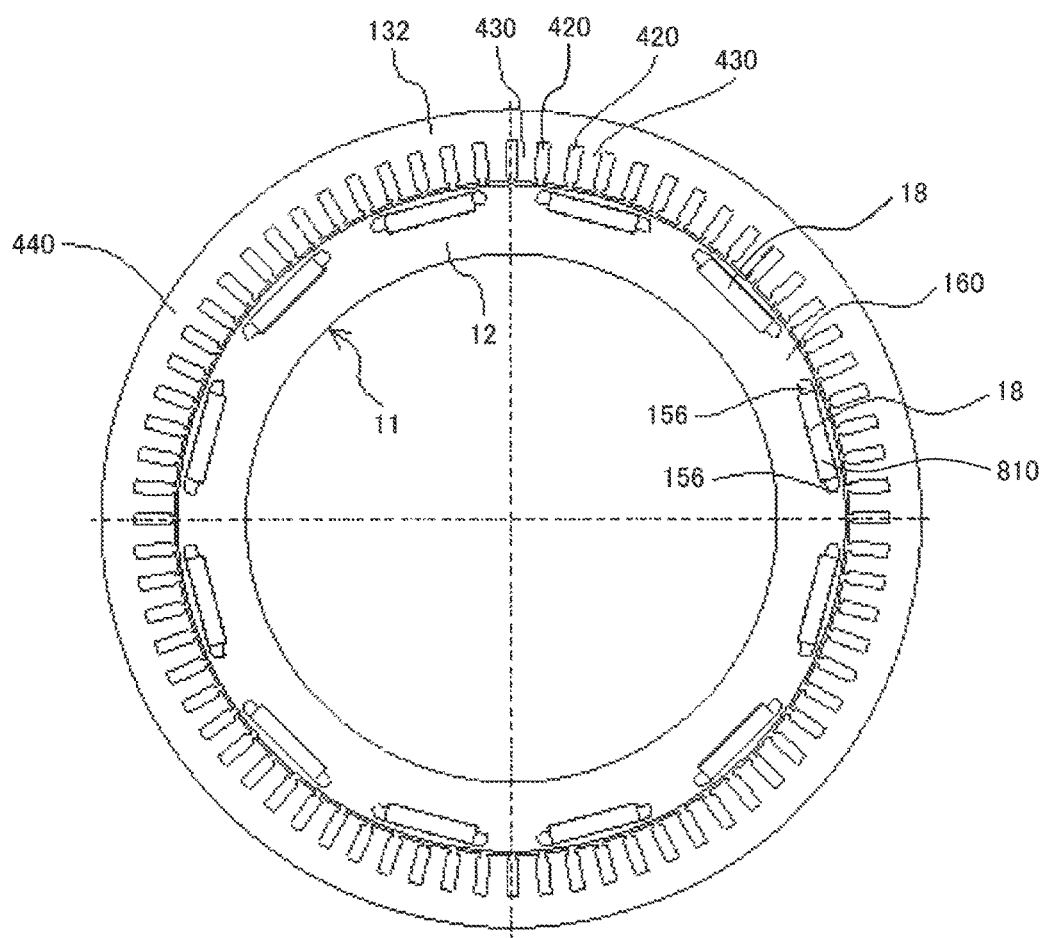
FIG. 4 is a sectional view illustrating a rotor 11, which transverses an axial direction in a right angle direction, and the stator 20.

The rotor 11 is configured by a rotor core 12 and the shaft 13. FIG. 4 illustrates a cross section of the rotor 11 together with the stator core 132. In FIG. 4, illustration of the shaft 13 is omitted. The rotor core 12 is a laminate of thin silicon steel sheets. The shaft 13 is fixed in the center of the rotor core 12. As shown in FIG. 1, the shaft 13 is rotatably held by the bearings 144 and 145 attached to the liquid cooling jacket 130, and rotates while being opposed to the stator 20 at a predetermined position within the stator 20. While not shown, the rotor 11 includes a permanent magnet 18 and an end ring 19.

As shown in FIG. 3, the slots 420 parallel to the axial direction of the stator core 132 are provided in the stator core 132 at equal intervals in the circumferential direction. The number of the slots 420 is, for example, 72 in this embodiment, and the stator coil 60 is accommodated in the slots 420. An inner peripheral side of each slot 420 is opened, and width of such an opening in the circumferential direction is substantially the same as that of a coil placement portion of the slot 420, or is slightly smaller than that of the coil placement portion.

Teeth 430 are provided between the slots 420 while being integrated with the annular core back 440. In other words, the stator core 132 is an integral-type core formed through integral forming of the teeth 430 and the core back 440. The teeth 430 guide a rotating magnetic field generated by the stator coil 60 to the rotor 11, so that the rotor 11 generates a rotational torque.

With the stator core 132, an electromagnetic steel sheet having a thickness of about 0.05 to 1.0 mm is formed into annular sheets by punching, and a plurality of such annular electromagnetic steel sheets are laminated and formed into the stator core 132. Welds 200 are provided parallel to the axial direction of the stator core 132 on the outer periphery of the cylindrical stator core 132 by TIG welding, laser welding, or the like. The stator core 132 may be directly inserted in the casing and fixed thereto by caulking or the like without providing the welds 200.

FIG. 4 is a sectional view illustrating the rotor 11, which transverses the axial direction in a right angle direction, and the stator 20. The rotor core 12 has magnet insertion holes 810, into which rectangular permanent magnets 18 are inserted, at equal intervals. The permanent magnets 18 are fixed in the magnet insertion holes 810 by an adhesive, a powder resin, molding, or the like. The width in the circumferential direction of each magnet insertion hole 810 is set larger than the width in the circumferential direction of the permanent magnet 18, and thus magnetic spaces 156 are provided on both sides of the permanent magnet 18. The magnetic space 156 may be filled with an adhesive, or may be filled with a molding resin that is then solidified integrally with the permanent magnet 18. The permanent magnet 18 serves to form a field pole of the rotor 11. Although this embodiment is designed such that one magnetic pole is formed by one permanent magnet 18, the number of permanent magnets 18 to form the magnetic pole may be increased to more than one. Such an increase in the number of the permanent magnets 18 increases the magnetic flux density of each magnetic pole formed by the permanent magnets, allowing magnet torque to be increased.

The magnetization direction of the permanent magnet 18 corresponds to the radial direction, and is reversed every field pole. In other words, assuming that a stator-side surface of the permanent magnet 18 for forming a magnetic pole is magnetized to an N pole while an axis-side surface thereof is magnetized to an S pole, the stator-side surface of the permanent magnet 18 forming an adjacent magnetic pole is magnetized to an S pole, and the axial-side surface thereof is magnetized to an N pole. Such permanent magnets 18 are arranged in the circumferential direction so as to be magnetized such that the magnetization direction is alternately changed every magnetic pole. In this embodiment, twelve permanent magnets 18 are arranged at equal intervals, and the rotor 11 has twelve magnetic poles.

A neodymium-based or samarium-based sintered magnet, a ferrite magnet, a neodymium-based bonded magnet, or the like can be used as the permanent magnet 18. In this embodiment, auxiliary magnetic poles 160 are provided between the permanent magnets 18 forming the magnetic poles. The auxiliary magnetic pole 160 acts to reduce the magnetic resistance of the q-axis magnetic flux generated by the stator coil 60. In addition, the magnetic resistance of the q-axis magnetic flux becomes extremely smaller than the magnetic resistance of a d-axis magnetic flux due to the auxiliary magnetic pole 160; hence, a large reluctance torque is generated.

Figure 5:
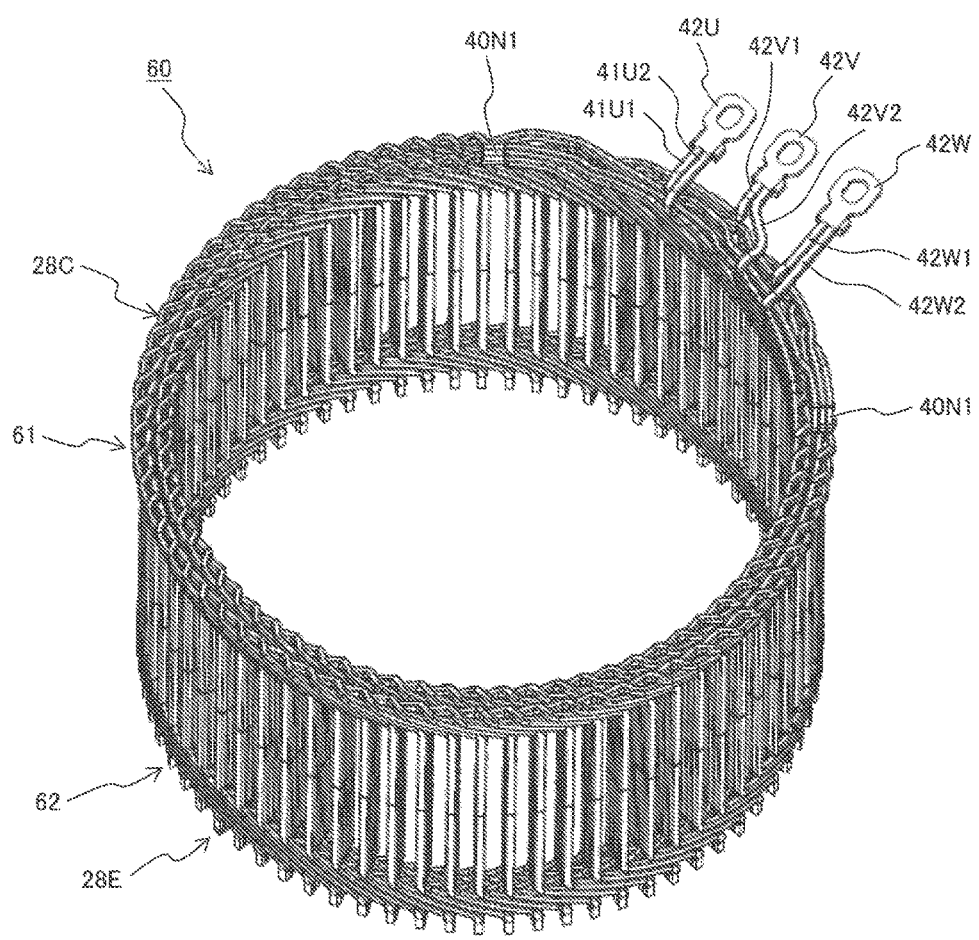
FIG. 5 is an overall perspective view of a stator coil 60.
Figure 6:
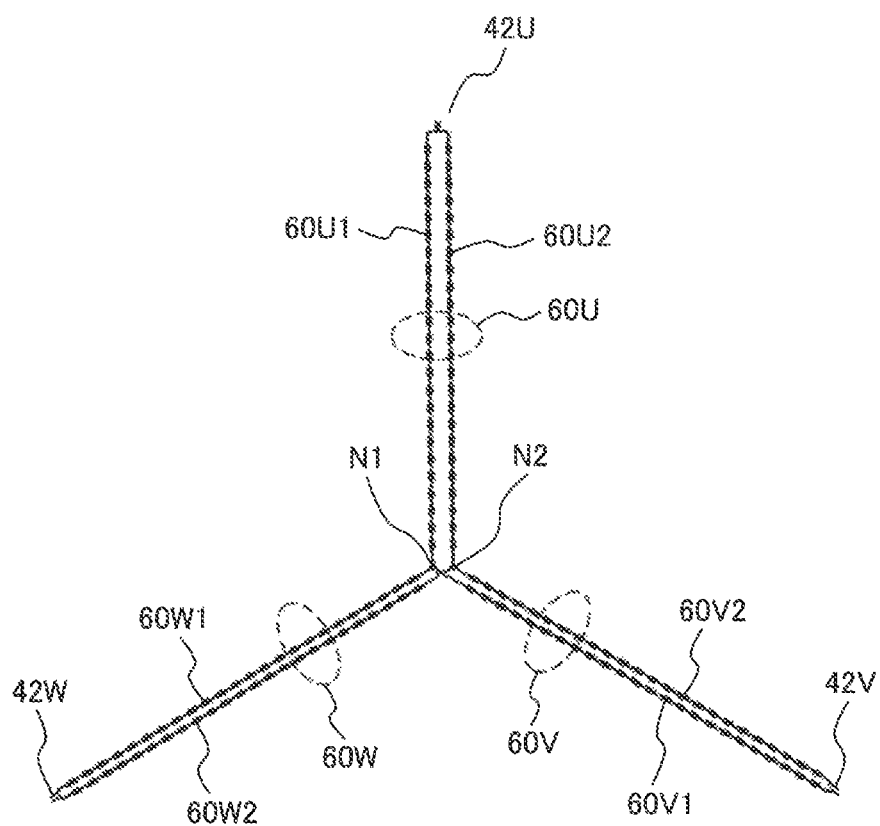
FIG. 6 is a conceptual diagram illustrating a connection state of the stator coil 60.

FIG. 5 is an overall perspective view of the stator coil 60. FIG. 6 is a conceptual diagram illustrating a connection state of the stator coil 60. In this embodiment, a stator coil having a two-star configuration, in which two star connections shown in FIG. 6 are connected in parallel, is used as the stator coil 60. Specifically, the stator coil 60 includes a star connection of a U1-phase coil 60U1, a V1-phase coil 60V1, and a W1-phase coil 60W1, and a star connection of a U2-phase coil 60U2, a V2-phase coil 60V2, and a W2-phase coil 60W2. N1 and N2 are neutral points of the respective star connections.

The stator coil 60 may have a round section or a rectangular section. However, the inner section of the slot 420 is effectively used as much as possible to reduce the internal space of the slot, which is likely to improve efficiency. Hence, a quadrilateral section is preferred from the viewpoint of efficiency improvement. The length of each side of the quadrilateral section may be set to be longer in the radial direction or the circumferential direction of the stator core 132.

A rectangular wire having a rectangular section is used for the stator coil 60 of this embodiment, and the long sides of the rectangular section are arranged in the circumferential direction of the stator core 132 in the slot 420 while the short sides thereof are arranged in the radial direction of the stator core 132. The outer periphery of the rectangular wire is covered with an insulating coating. Oxygen-free copper or oxygen-containing copper is used for the stator coil 60. For example, the oxygen-containing copper has an oxygen content of about 10 to about 1000 ppm.

Figure 7A:
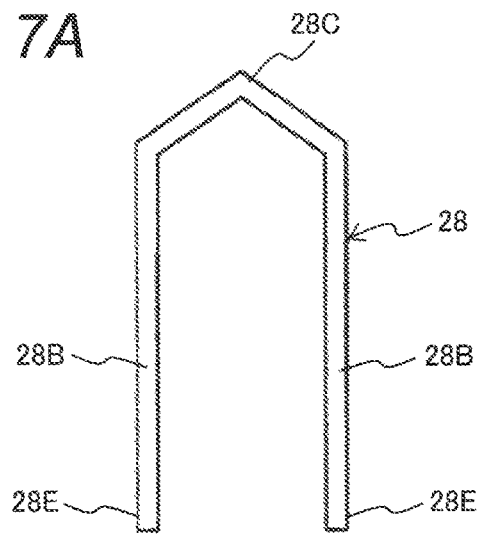
FIGS. 7A and 7B are conceptual diagrams for explaining a segment conductor 28 configuring the stator coil 60.
Figure 7B:
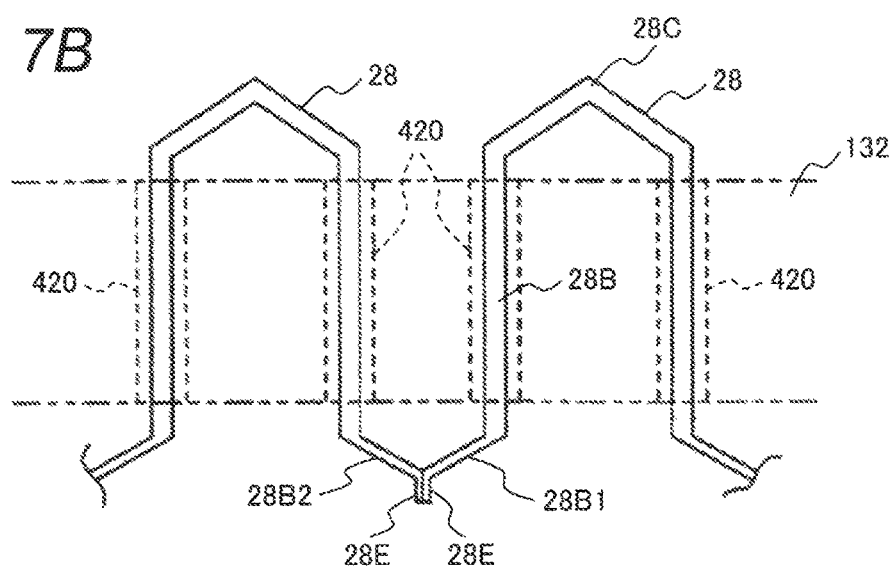

FIGS. 7A and 7B are conceptual diagrams explaining a segment conductor 28 configuring the stator coil 60. FIG. 7A shows a shape of the segment conductor 28 that has not been mounted in the stator core 132. FIG. 7B shows a shape of the segment conductor 28 that has been mounted in the stator core 132. The segment conductor 28 is formed of the rectangular wire, and has a substantially U shape having a pair of legs 28B and a crown 28C connecting between the legs 28B.

When the segment conductors 28 are connected together to form each phase coil, as shown in FIG. 7B, the pair of legs 28B of the segment conductor 28 are inserted into different slots 420 from a first side in the axial direction of the stator core 132. Subsequently, each leg 28B protruding to a second side in the axial direction of the stator core 132 is bent toward a segment conductor 28 to be connected, and an end portion 28E of the leg 28B is welded to an end portion 28E of that segment conductor 28.

A set of the crowns 28C protruding to the first side of the stator core 132 configure a coil end 61 on one side of the stator coil 60 shown in FIG. 5. A set of the end portions 28E protruding to the second side of the stator core 132 configures a coil end 62 on the other side of the stator coil 60 shown in FIG. 5. Hereinafter, the coil end 62 is referred to as a welding-side coil end 62, and the coil end 61 is referred to as an anti-welding-side coil end 61.

As shown in FIGS. 5 and 6, a lead wire 41U1 connected to a first end of the U1-phase coil 60U1 and a lead wire 41U2 connected to a first end of the U2-phase coil 60U2 are led out on a side of the anti-welding-side coil end 61. The lead wire 41U1 and the lead wire 41U2 are combined into one by an AC terminal 42U. Similarly, a lead wire 41V1 and a lead wire 41V2 connected to one end of the V1-phase coil 60V1 and one end of the V2-phase coil 60V2, respectively, are combined in one by an AC terminal 42V on the side of the anti-welding-side coil end 61. A lead wire 41W1 and a lead wire 41W2 connected to one end of the W1-phase coil 60W1 and one end of the W2-phase coil 60W2, respectively, are combined in one by an AC terminal 42W.

A neutral connection conductor 40N1 and a neutral connection conductor 40N2 are disposed on the side of the anti-welding-side coil end 61. The neutral connection conductor 40N1 relates to a neutral point N1 (see FIG. 6) of a first star connection, and the neutral connection conductor 40N2 relates to a neutral point N2 of a second star connection. The stator coil 60 is wound in a distributed winding manner.

The distributed winding is a winding method, in which a phase winding is wound around the stator core 132 so that the phase winding is accommodated in two slots 420 spaced across a plurality of slots 420 (see FIG. 3). This embodiment is characterized in that since the distributed winding is used as the winding system, magnetic flux distribution caused by the distributed winding is similar to a sinusoidal wave as compared with magnetic flux distribution caused by concentrated winding, and thus reluctance torque easily occurs. Hence, the dynamo-electric machine 10 is improved in controllability of field weakening control and of control using the reluctance torque, and can be used over a wide rotational speed range from a low rotation speed to a high rotation speed, and thus provides excellent motor characteristics suitable for an electric vehicle.

Figure 8:
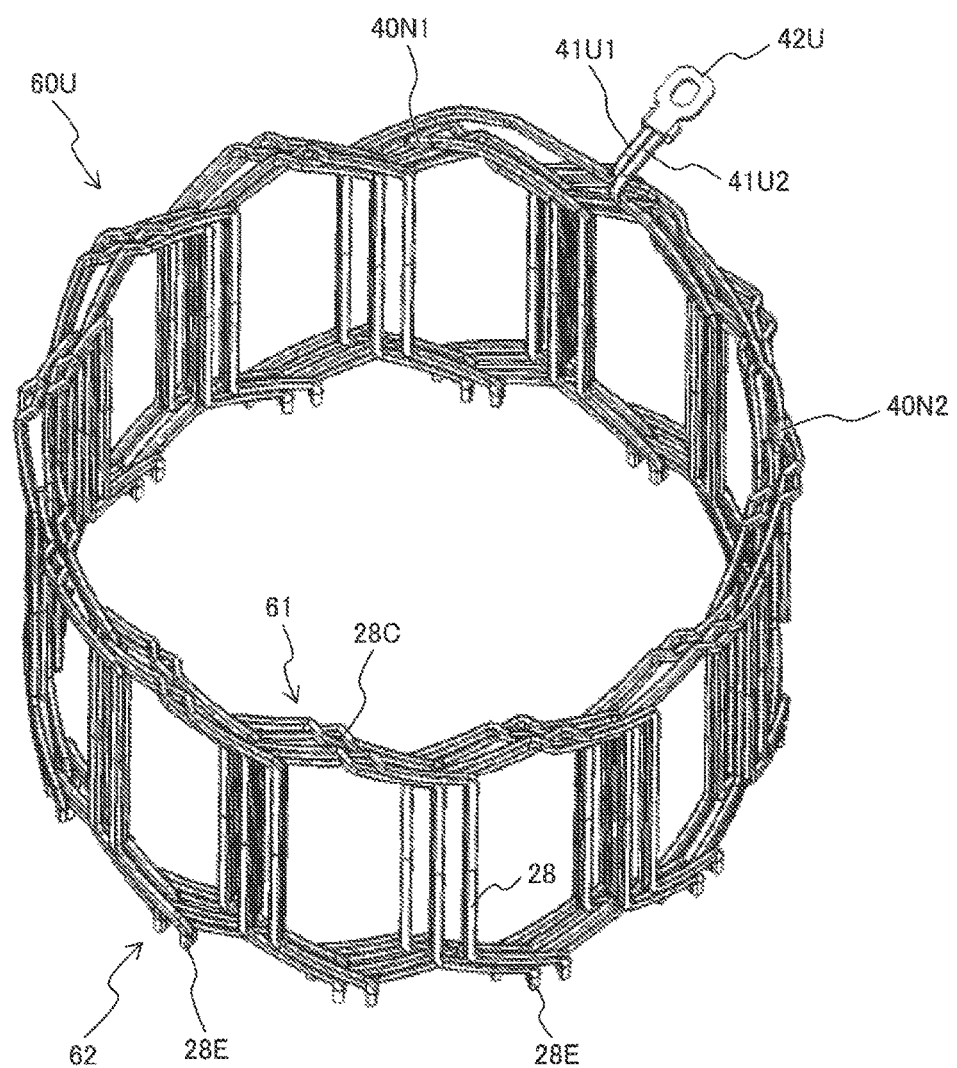
FIG. 8 is a perspective view illustrating a U-phase coil 60U corresponding to one phase of the stator coil 60 shown in FIG. 5.
Figure 9:
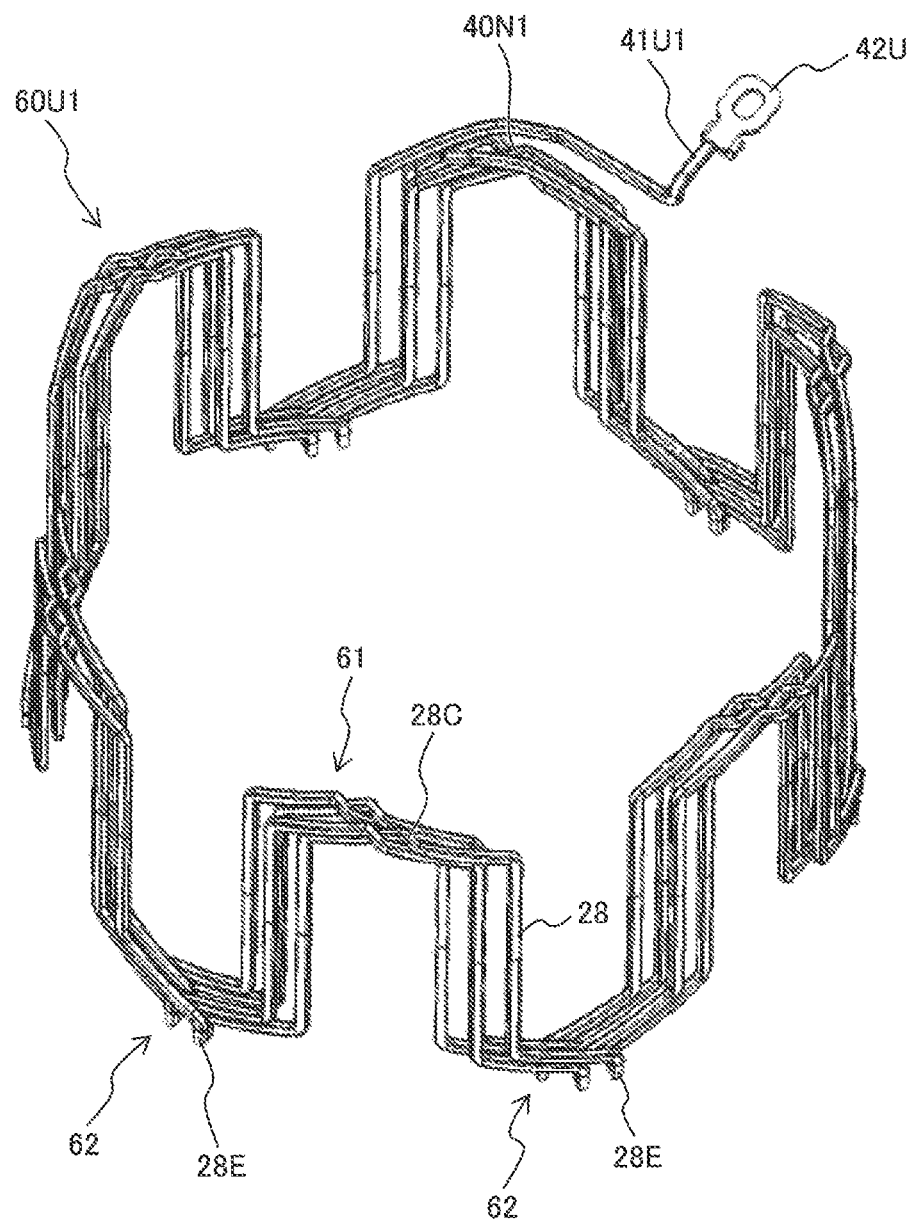
FIG. 9 is a perspective view illustrating a U1-phase coil 60U1.
Figure 10:
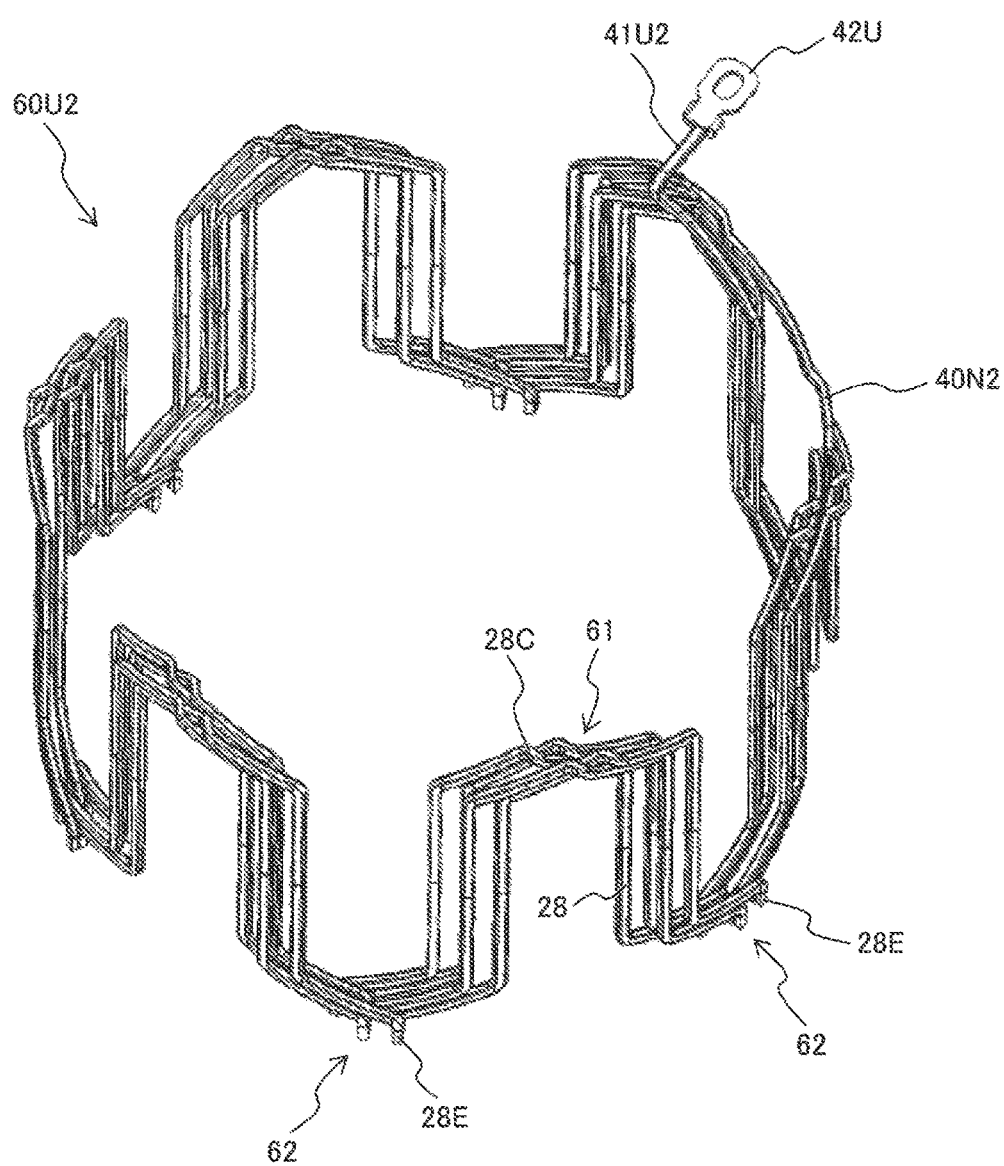
FIG. 10 is a perspective view illustrating a U2-phase coil 60U2.

FIG. 8 is a perspective view illustrating a U-phase coil 60U corresponding to one phase of the stator coil 60 shown in FIG. 5. As shown in FIG. 6, the U-phase coil 60U is configured of the U1-phase coil 60U1 of the first star connection and the U2-phase coil 60U2 of the second star connection. FIG. 9 is a perspective view illustrating the U1-phase coil 60U1. FIG. 10 is a perspective view illustrating the U2-phase coil 60U2. As shown in FIGS. 9 and 10, the neutral connection conductor 40N1 is connected to a second end of the U1-phase coil 60U1, and the neutral connection conductor 40N2 is connected to a second end of the U2-phase coil 60U2.

[Description of Manufacturing Method of Stator]
[Bending]

A method of manufacturing the stator 20 of this embodiment is now described. The segment conductor 28 in the state of FIG. 7A is inserted into the slots of the stator core 132 as described above, and then each leg 28B is bent toward another segment conductor 28 to be connected as shown in FIG. 7B. The leg 28B extracted from each slot 420 is bent toward the segment conductor 28 to be connected. For example, a leg 28B1 protruding from the slot 420 is bent to the left in the circumferential direction. On the other hand, a leg 28B2 having an end portion 28E2 is bent to the right in the circumferential direction. An end portion 28E1 and the end portion 28E2 are disposed adjacent to each other in the radial direction.

Figure 11:
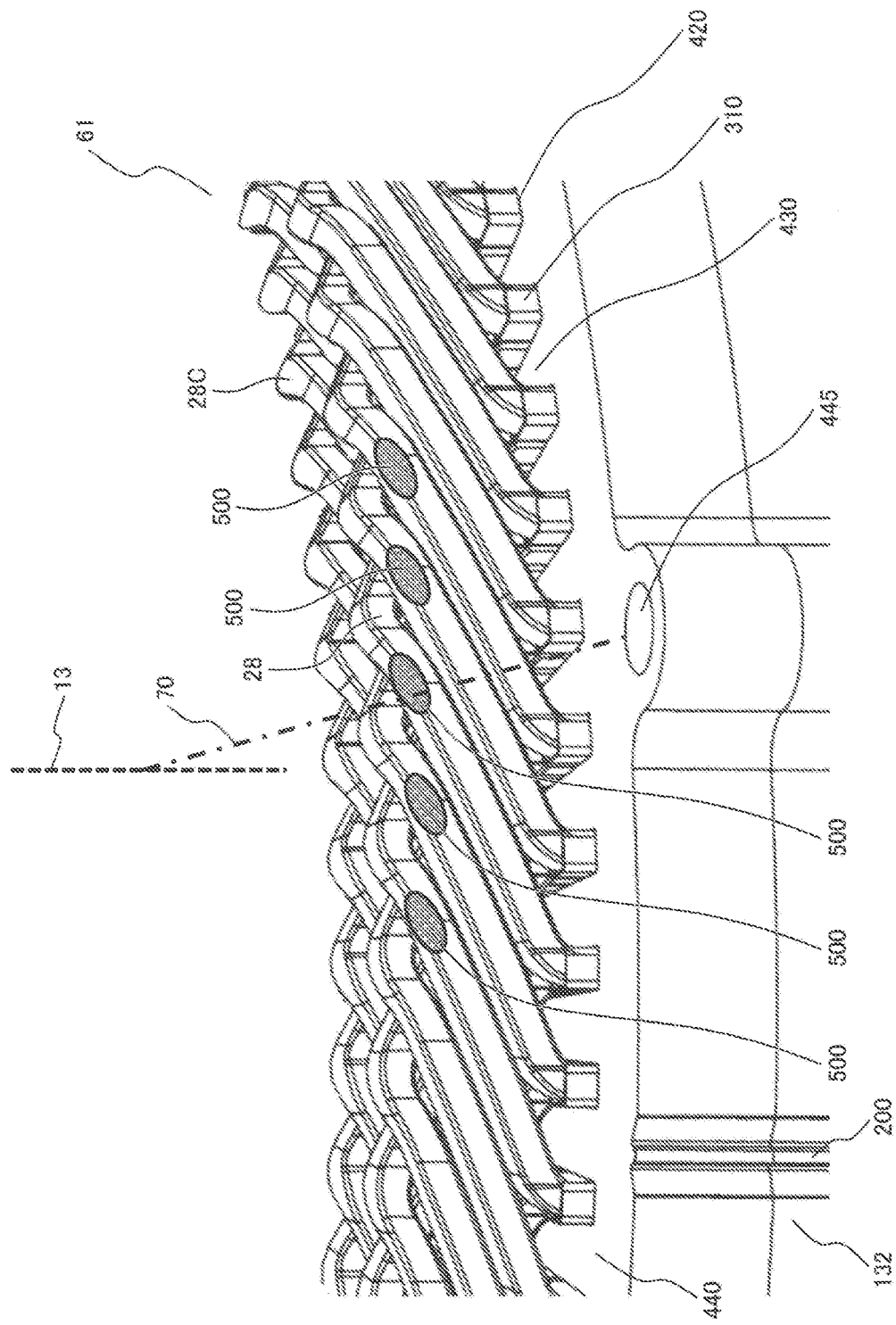
FIG. 11 is an enlarged perspective view of the stator according to the one embodiment on a side of an anti-welding-side coil end 61.
Figure 12:
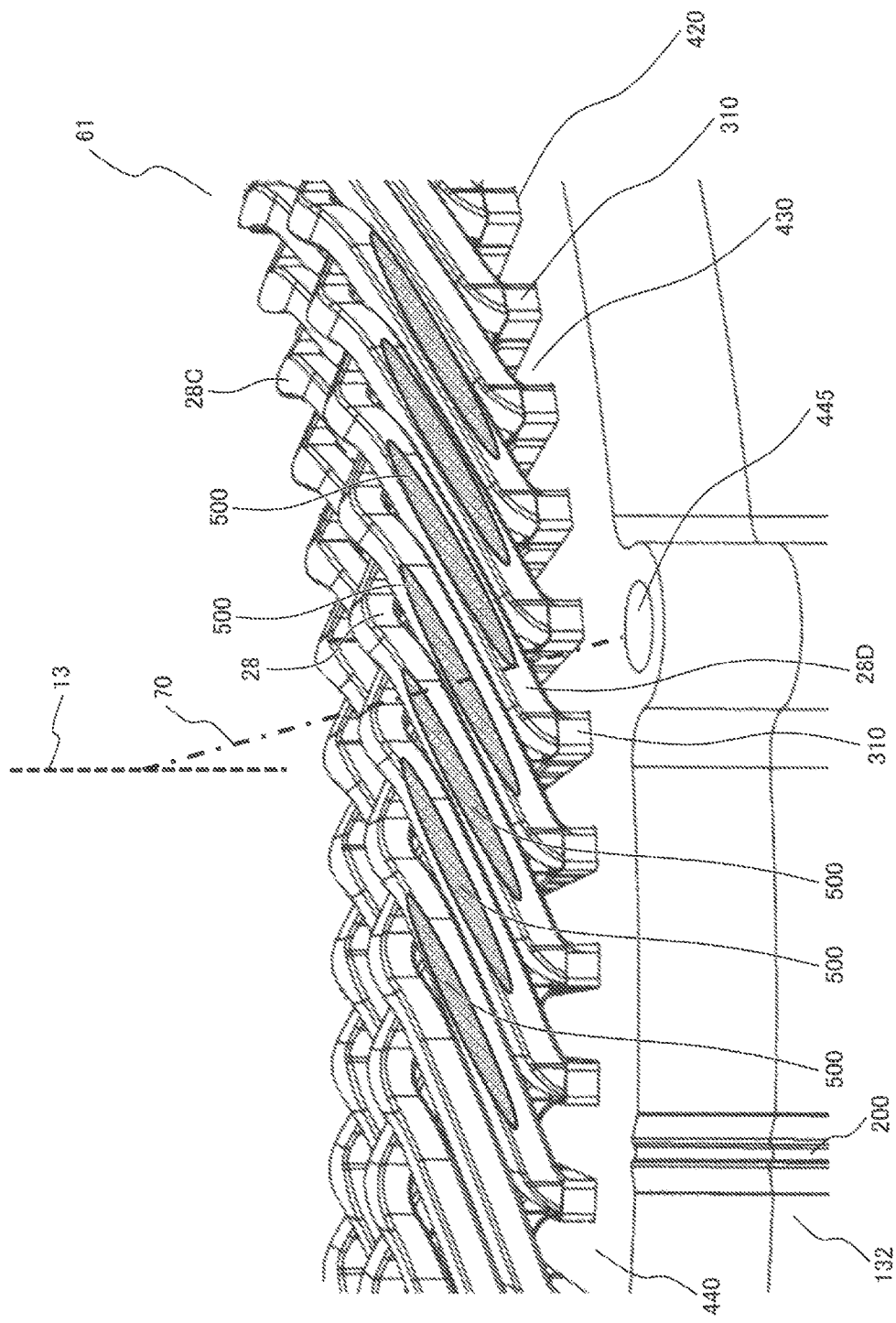
FIG. 12 is an enlarged perspective view of the stator according to another embodiment on the side of the anti-welding-side coil end 61.
Figure 13:
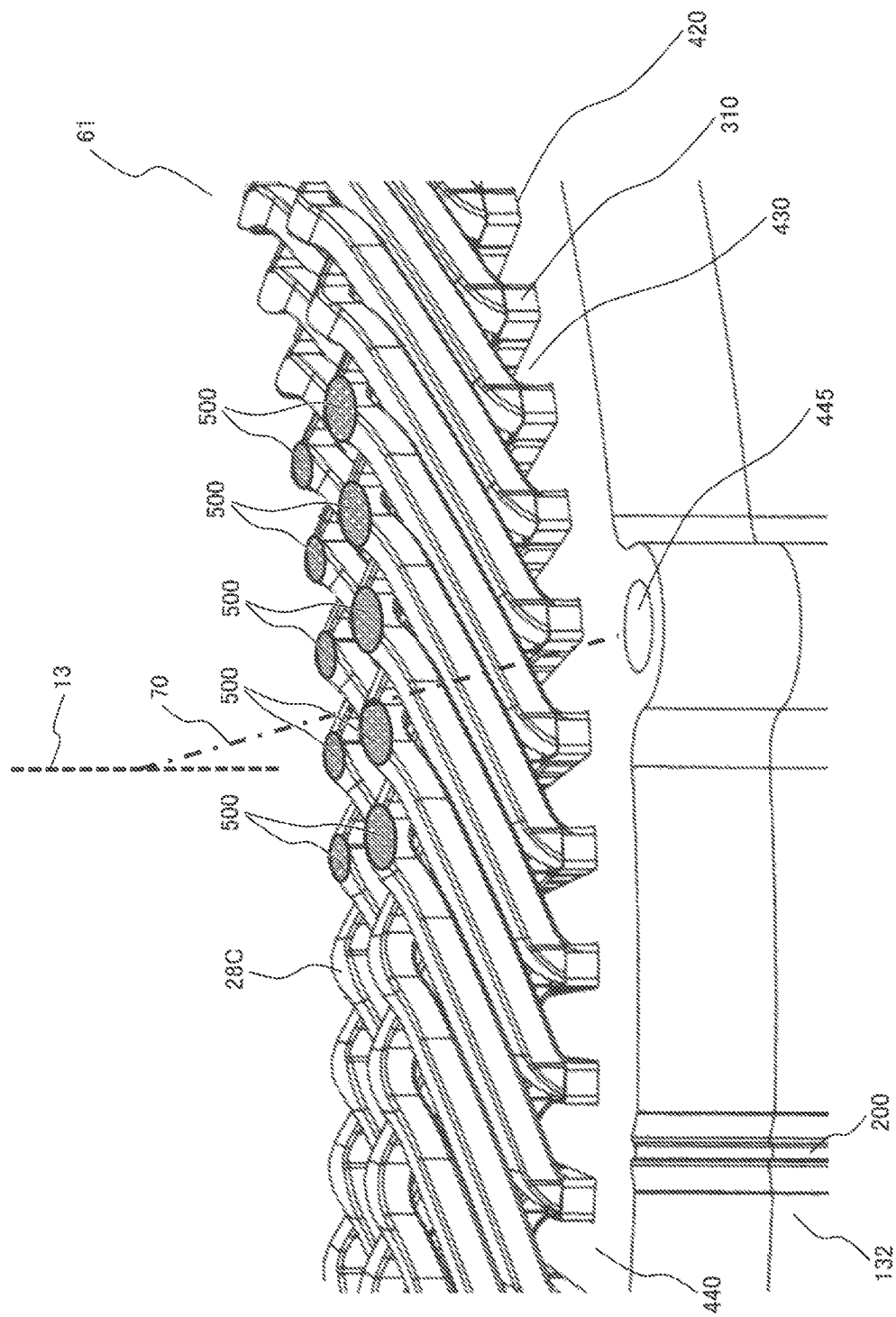
FIG. 13 is an enlarged perspective view of the stator 20 according to another embodiment on the side of the anti-welding-side coil end 61.

FIG. 11 is an enlarged perspective view of the stator according to this embodiment on the side of the anti-welding-side coil end 61. FIG. 12 is an enlarged perspective view of a stator 20 according to another embodiment on the side of the anti-welding-side coil end 61. FIG. 13 is an enlarged perspective view of a stator 20 according to another embodiment on the side of the anti-welding-side coil end 61. The dynamo-electric machines shown in FIGS. 11 to 13 are each provided such that an imaginary circle connecting between the crowns 28C of the segment coils 28 has an angle different from 90° with respect to a vertical direction. As shown in FIGS. 11 to 13, an insulating coating 500 covers at least certain portions of the segment conductors 28 protruding from a stator back 400. The segment coils 28 are arranged in a direction radially outward from the rotation axis of the shaft 13. As shown in FIG. 13, the insulating coating 500 is provided such that its volume is larger on a radially outer side than on a side close to the rotation axis of the shaft 13. Thus, flow of the refrigerant (RF) can be adjusted, making it possible to uniformly and effectively cool the whole circumference of the coil. More specifically, the refrigerant (RF), which outflows to the outer periphery side of the segment coils 28 arranged in the radial direction, is allowed to flow to the inner diameter side of the stator core 132. This allows the refrigerant (RF) to be easily brought into contact with the surface of the segment coil 28, leading to an improvement in cooling performance. Furthermore, this increases the area over which a liquid coolant (RF) such as oil dropped from the upper side is in contact with the coil surface, leading to an improvement in cooling effect.

As shown in FIG. 11, the insulating coating 500 may be provided only on the segment coil 28 configuring the farthermost layer from the rotation axis of the shaft 13.

As shown in FIG. 11, a fixing part 445 is connected to the liquid cooling jacket 130 using an undepicted connecting member on the side of the anti-welding-side coil end 61. The connecting member includes a volt, for example. A line segment 70 is an imaginary line segment connecting the rotation axis of the shaft 13 shown in FIG. 1 to the fixing part 445. The insulating coating 500 is provided in at least a region where the line segment 70 overlaps with the segment conductor 28. A thermosetting epoxy resin is mainly used as the insulating resin 500. It is thus possible to secure an insulation distance from the bolt or the like as the connecting member that fixes the fixing part 445, and thus insulating performance is also improved. For example, the stator 20 is connected to the liquid cooling jacket 130 by the connecting member at the timing at which the insulating resin 500 is applied on the anti-welding-side coil end 61, thereby the insulation reliability during assembly can be improved.

Furthermore, the material of the insulating coating 500 shown in FIG. 12 is the same as the material of that in the embodiment shown in FIG. 11, and mainly includes a thermosetting epoxy resin. The embodiment shown in FIG. 12 is different from the embodiment shown in FIG. 11 in that the insulating resin 500 is provided on a side surface of the anti-welding-side coil end 61 opposed to the fixing part 445. Specifically, the segment coil 28 has an oblique portion 28D that is bent to have an angle with respect to a protruding direction from the core back 440 and leads to the crown 28C of the segment coil 28. The insulating coating 500 is provided on the oblique portion 28D. Furthermore, the insulating coating 500 may be in contact with a slot liner 310. This further improves the insulation for the bolt or the like as the connecting member to fix the fixing part 445.

The insulating resin 500 may be provided on a crown 28C of the anti-welding-side coil end 61 at a narrow gap position between the crown 28C and a mission part. As a result, the refrigerant (RF) easily accumulates in the gap between the crown 28C and the mission part, so that the refrigerant (RF) is in contact with the crown 28C for a longer time, leading to an improvement in cooling performance. In addition, the gap between the crown 28C and the mission part becomes narrower, thereby a flow direction of the refrigerant (RF) can be easily changed.

According to the above-described embodiment, the following functions and effects are provided.

The stress occurring in the weld as a connecting part mainly includes stress occurring during heating or cooling. Hence, since the anti-welding-side coil end portion is effectively cooled by the liquid coolant (RF) such as oil or cooling wind, heat generated by the stator is more efficiently reduced, so that temperature rise of the stator can be reduced. It is possible to provide a stator of a dynamo-electric machine that is excellent in cooling performance while being small in size and high in output.

Although various embodiments and modifications have been described hereinbefore, the present invention should not be limited to the contents thereof. Other embodiments that can be considered within the scope of the technical idea of the present invention are also included in the scope of the present invention.

DESCRIPTION OF THE REFERENCE NUMERALS AND SIGNS

10 Dynamo-electric machine
11 Rotor
12 Rotor core
13 Shaft
18 Permanent magnet
20 Stator
28 Segment conductor
28B Leg
28C Crown
28E End portion
40N1 Neutral connection conductor
40N2 Neutral connection conductor
41U1 Lead wire
41U2 Lead wire
41V1 Lead wire
41V2 Lead wire
41W1 Lead wire
41W2 Lead wire 42U AC terminal
42V AC terminal
42W AC terminal
50 Housing
60 Stator coil
60U U-phase coil
60U1 U1-phase coil
60U2 U2-phase coil
60V1 V1-phase coil
60V2 V2-phase coil
60W1 W1-phase coil
60W2 W2-phase coil
61 Anti-welding-side coil end
62 Welding-side coil end
130 Liquid cooling jacket
132 Stator core
144 Bearing
145 Bearing
150 Refrigerant (oil) storage space
153 Refrigerant passage
154 Refrigerant passage
155 Refrigerant passage
156 Magnetic space
160 Auxiliary magnetic pole
200 Weld
310 Slot liner
420 Slot
430 Teeth
440 Core back
445 Fixing part
500 Insulating coating
BAT Battery
ENG Engine
FW Front drive wheel
INV Power conversion device
N1 Neutral point
N2 Neutral point
TR Transmission
RF Refrigerant
RW Rear drive wheel

What is claimed is:

1. A stator of a dynamo-electric machine, comprising:
a plurality of segment coils surrounding a rotation axis;
a stator core partially accommodating each of the segment coils; and
an insulating coating covering at least certain portions of the segment coils protruding from an accommodating space of the stator core, wherein
the segment coils are arranged in a direction from the rotation axis to a radially outer side, and
wherein volume of the insulating coating is larger on a radially outer side than on a side close to the rotation axis.

2. The stator of the dynamo-electric machine according to claim 1, wherein the insulating coating is provided only on one of the segment coils, the one segment coil configuring a farthermost layer from the rotation axis.

3. The stator of the dynamo-electric machine according to claim 1, wherein the stator core includes a fixing part for connection to another member using a connecting member, and
wherein the insulating coating is provided in a region in which an imaginary line segment connecting the rotation axis surrounded by the stator core to the fixing part overlaps with the segment coils.

4. The stator of the dynamo-electric machine according to claim 3, wherein each of the segment coils has an oblique portion that is bent to have an angle with respect to a protruding direction from the accommodating space of the stator core and leads to a crown of the segment coil, and
wherein the insulating coating is provided on the oblique portion.

5. The stator of the dynamo-electric machine according to claim 4, further comprising slot liners that are provided in the accommodating space of the stator core, and isolate the segment coils from the stator core, wherein
certain portions of the slot liners protrude from the accommodating space of the stator core, and
wherein the insulating coating is in contact with the certain portions of the slot liners.

6. A dynamo-electric machine including the stator according to claim 1, wherein the stator is provided such that an imaginary circle connecting between crowns of the segment coils has an angle different from 90° with respect to a vertical direction.

7. A method of manufacturing a stator of a dynamo-electric machine, the method comprising:
a first step of partially accommodating each of a plurality of segment coils in an accommodating space provided in a stator core in a manner of being arranged in a direction from a rotation axis to a radially outer side;
a second step of providing an insulating coating in a portion in which an imaginary line segment connecting a fixing part of the stator core to the rotation axis overlaps with the segment coils; and
a third step of fixing the fixing part of the stator core to a stator support with a fixing member.

* * * * *